United States Patent
Arduini

(10) Patent No.: US 7,843,077 B2
(45) Date of Patent: Nov. 30, 2010

(54) PULSED ENERGY TRANSFER

(76) Inventor: Douglas P. Arduini, 506 Cartagena La., San Ramon, CA (US) 94583-1845

( * ) Notice: Subject to any disclaimer, the term of this patent is extended or adjusted under 35 U.S.C. 154(b) by 230 days.

(21) Appl. No.: 12/079,489

(22) Filed: Mar. 27, 2008

(65) Prior Publication Data

US 2008/0284168 A1 Nov. 20, 2008

Related U.S. Application Data

(60) Provisional application No. 60/930,599, filed on May 16, 2007.

(51) Int. Cl.
*F03D 7/00* (2006.01)
(52) U.S. Cl. .................. 290/43; 290/44; 290/53
(58) Field of Classification Search ............ 290/55, 290/44
See application file for complete search history.

(56) References Cited

U.S. PATENT DOCUMENTS

| | | | | | |
|---|---|---|---|---|---|
| 1,025,428 | A | * | 5/1912 | Stanschus | 415/4.3 |
| 2,539,862 | A | * | 1/1951 | Rushing | 62/230 |
| 3,339,078 | A | * | 8/1967 | Crompton | 290/44 |
| 3,743,848 | A | * | 7/1973 | Strickland | 290/55 |
| 3,883,750 | A | * | 5/1975 | Uzzell, Jr. | 290/55 |
| 3,944,840 | A | * | 3/1976 | Troll | 290/55 |
| 4,021,135 | A | * | 5/1977 | Pedersen et al. | 415/208.2 |
| 4,075,500 | A | * | 2/1978 | Oman et al. | 290/55 |
| 4,087,196 | A | * | 5/1978 | Kronmiller | 415/4.5 |
| 4,140,433 | A | * | 2/1979 | Eckel | 415/209.1 |
| 4,357,542 | A | * | 11/1982 | Kirschbaum | 290/44 |
| 4,443,155 | A | * | 4/1984 | Smith | 416/32 |
| 4,461,957 | A | * | 7/1984 | Jallen | 290/44 |
| 4,464,579 | A | * | 8/1984 | Schwarz | 290/44 |
| 4,483,657 | A | * | 11/1984 | Kaiser | 416/51 |
| 4,613,763 | A | * | 9/1986 | Swansen | 290/44 |
| 5,161,952 | A | * | 11/1992 | Eggers, Jr. | 416/223 R |
| 5,219,454 | A | * | 6/1993 | Class | 416/145 |
| 6,246,126 | B1 | * | 6/2001 | Van Der Veken et al. | 290/55 |
| 6,285,090 | B1 | * | 9/2001 | Brutsaert et al. | 290/55 |
| 6,285,178 | B1 | * | 9/2001 | Ball et al. | 323/351 |
| 7,018,166 | B2 | * | 3/2006 | Gaskell | 415/4.3 |
| 7,094,018 | B2 | * | 8/2006 | Grubb | 415/4.3 |
| 7,245,039 | B2 | * | 7/2007 | DuHamel | 290/44 |
| 7,635,923 | B2 | * | 12/2009 | DeAngeles | 290/44 |
| 2008/0223684 | A1 | * | 9/2008 | Duffey et al. | 192/105 R |

FOREIGN PATENT DOCUMENTS

SU 780142 B * 11/1980
WO WO 8301279 A1 * 4/1983

* cited by examiner

*Primary Examiner*—Joseph Waks
(74) *Attorney, Agent, or Firm*—David Lewis

(57) ABSTRACT

A system capable of converting fluid energy into electrical energy in conditions of low fluid flow is provided. In an embodiment, the system may engage and disengage an energy converter via an automatic clutch. In an embodiment, the transmission of energy to an energy converter is controlled by switching the energy converter on and off. In another embodiment, the flow of electrical energy to an electrical load is controlled by a switching device. In another embodiment, a funnel is used for condensing the flow of fluid moving through the system.

20 Claims, 6 Drawing Sheets

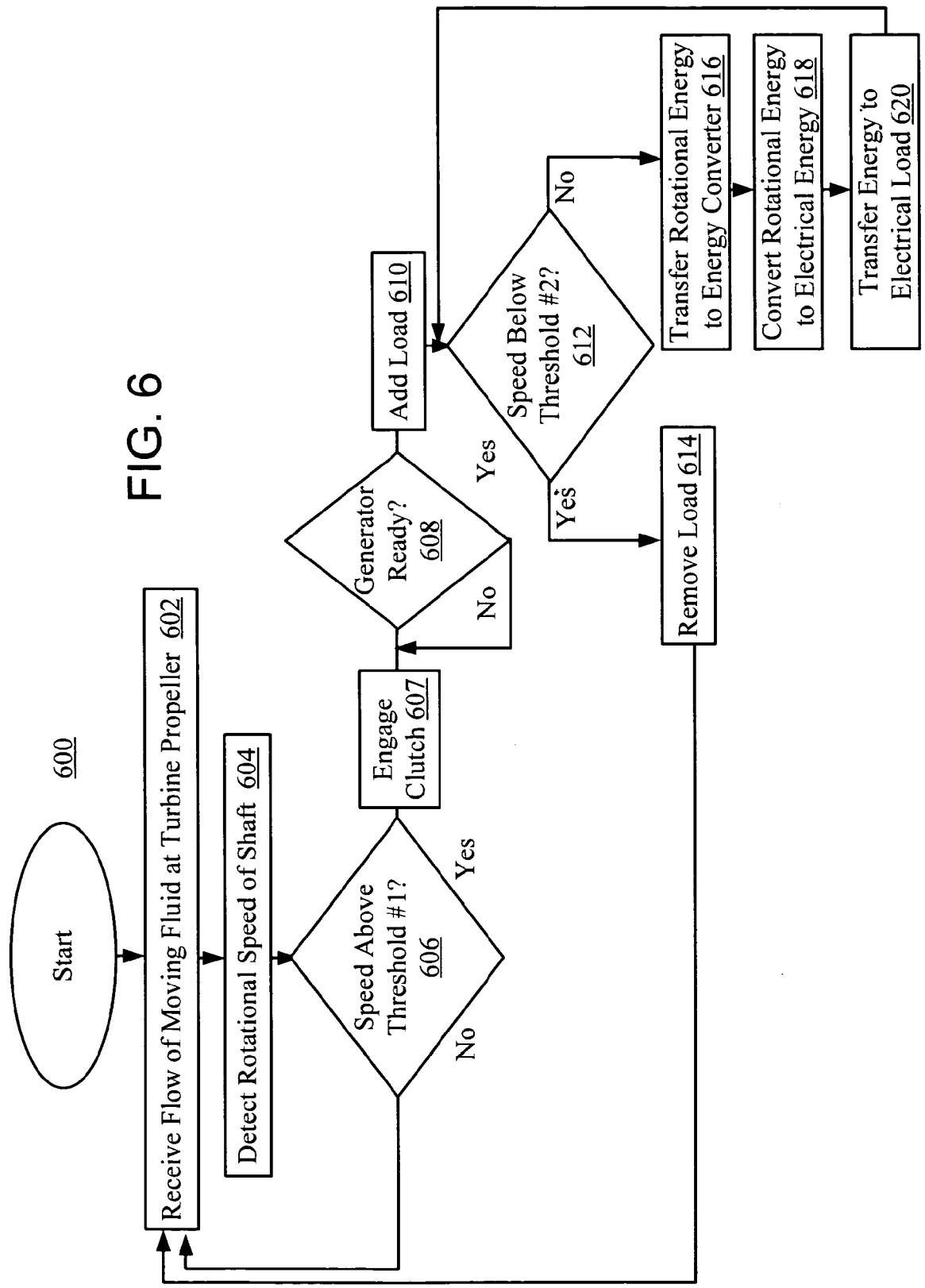

PULSED ENERGY TRANSFER

CROSS-REFERENCE TO RELATED APPLICATIONS

This application claims priority benefit of U.S. Provisional Patent Application No. 60/930,599, filed May 16, 2007, which is incorporated herein by reference.

FIELD

The invention relates to converting energy of a flowing fluid into electrical energy.

NOTICE OF COPYRIGHT

A portion or portions of the disclosure of this document contains content that is subject to protection by copyright. There is no objection by the copyright owner to the facsimile reproduction of the patent document and/or the patent disclosure as it is displayed in the records and files of the Patent and Trademark Office, however, the copyright owner reserves all protections otherwise afforded.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numbers are used to refer to like elements. Although the following figures depict various examples of the invention, the invention is not limited to the examples depicted in the figures.

FIG. 6 shows a flowchart of an example of a method of using a pulsed generator system.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In general, at the beginning of the discussion of each of FIGS. 1-4 is a brief description of each element, which may have no more than the name of each of the elements in the particular figure that is being discussed. After the brief description of each element, each element of FIGS. 1-6 is further discussed in numerical order. In general, each of FIGS. 1-6 is discussed in numerical order, and the elements within FIGS. 1-6 are also usually discussed in numerical order to facilitate easily locating the discussion of a particular element. Nonetheless, there is not necessarily any one location where all of the information of any element of FIGS. 1-6 is located. Unique information about any particular element or any other aspect of any of FIGS. 1-6 may be found in, or implied by, any part of the specification.

Figure 1:
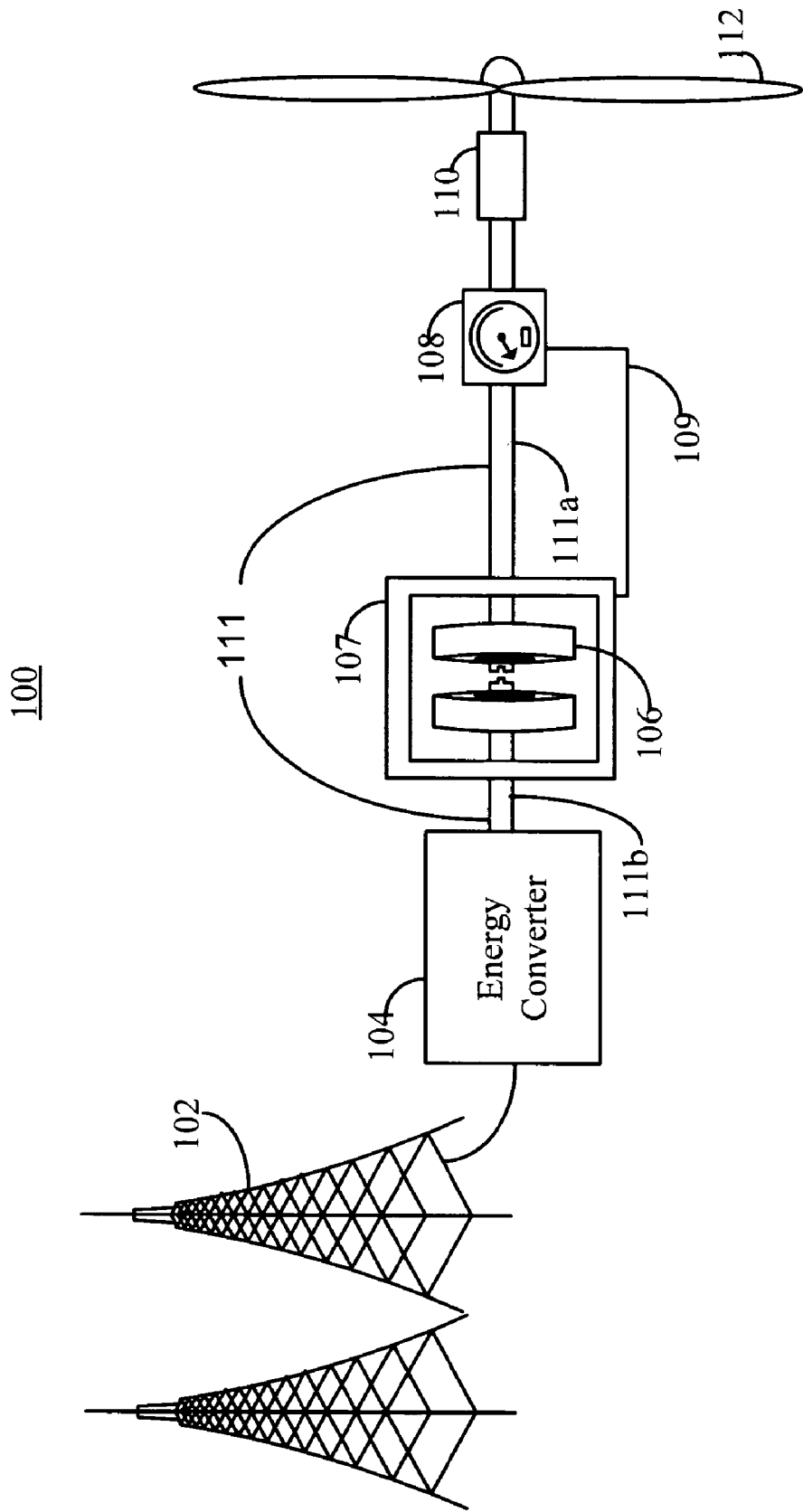
FIG. 1 shows a block diagram of an embodiment of a pulsed generator.

FIG. 1 shows a diagram of an embodiment of pulsed system 100. Pulsed system 100 includes electrical load 102, converter 104, clutch 106, clutch control 107, speed sensor 108, wiring 109, rotational mass 110, shaft 111 having first shaft segment 111*a* and second shaft segment 111*b*, and turbine 112. In other embodiments, pulsed energy transfer system 100 may not have all of the components listed above or may have other components instead of and/or in addition to those listed above.

Pulsed system 100 may convert the energy of the flow of a fluid (e.g., air, water, gas) into electrical energy. Pulsed system 100 may be capable of converting fluid flow into electricity in conditions where the flow rate of a fluid is too low for converting fluid flow into electricity without pulsed system 100, by pulsing (e.g., periodically engaging and disengaging) an energy converter so that the energy converter converts the energy only during certain periods of time, which may be brief in duration and may occur frequently in succession and may be continuous. In an embodiment, pulsed system 100 may store rotational energy at low-flow conditions while disconnected from an electrical load, and then be connected to transfer energy to an electrical load. In the specification, the term "low-flow" refers to conditions wherein the flow of moving fluid is insufficient for overcoming resistive force, such as static and kinetic friction, drag on the turbine blades, and resistive forces resulting from Lenz's law and from electrical load 102. Consequently, in such conditions the components are unable to generate mechanical energy efficiently or at all. Further, the term "hi-flow" refers to conditions wherein the flow of moving fluid is sufficient for overcoming the static friction and drag acting on the components, and in which the components are able to generating mechanical energy.

Electrical load 102 may represent a consumption of power associated with devices or structures that receive electrical energy from pulsed energy transfer system 100. For example, electrical load 102 may be one or more electrical appliances, a series of batteries that receive and store energy for future use, a home wired to receive generated energy, or a portion of an electrical grid that transmits power to general consumers.

Energy converter 104 may convert mechanical energy into electrical energy and transfer the electrical energy to electrical load 102. For example, energy converter 104 may be a generator, alternator, inverter, or combination thereof. In an embodiment, energy converter 104 may receive kinetic energy generated by the rotation of a fan, turbine or other device capable of producing mechanical energy from the flow of moving fluids. Energy converter 104 may convert received energy into electrical energy, and transfer the electrical energy to electrical load 102. In another embodiment, energy converter 104 may receive and carry out instructions from an external device for connecting to or disconnecting from electrical load 102.

Clutch 106 may engage or disengage to allow or disallow the transmission of rotational energy between segments of a rotatable shaft. In an embodiment, clutch 106 may join a segment of a rotatable shaft connected to a device for generating mechanical energy (e.g., a turbine) to a segment of rotatable shaft connected to a device for converting mechanical energy into electrical energy (e.g., energy converter 104) at a slower speed in a manner such that a plot of energy verses energy output may exhibit a hysteresis. In an embodiment, clutch 106 may be an automatically operating centrifugal clutch. For example, as the segment of the rotatable shaft connected to clutch 106 increases in rotations per minute, weighted arms within clutch 106 may extend outward, causing clutch 106 to engage and join the segments of the rotatable shaft. As a result of the engaging of clutch 106, the amount of torque required to turn the rotatable shaft increases, and in low-flow conditions there may not be enough energy in the rotating turbine to sustain the continued rotation of the rotatable shaft, which may cause the rotatable shaft to slow its rate of rotation. The weighted arms may be mechanically biased (e.g. spring biased) to move inwards. Consequently, the slowing of the rate of rotation may cause clutch 106 to disengage (e.g., as a result of the weighted arms moving inwards) causing the segments of the rotatable shaft to separate.

Optional clutch control 107 may receive a signal from a device that detects the rotational speed of the shaft, and engage or disengage clutch 106 based on the signal. Clutch control 107 may be capable of evaluating other signals relevant to the performance of pulsed system 100. Optionally, clutch 106 may engage when the turbine speed is above a first threshold and disengage when the turbine speed is below a second threshold that is lower than the first threshold.

Speed sensor 108 may detect the rotational speed (e.g. Rotations Per Minute) of a rotatable shaft, and send a signal to clutch 106 or clutch control 107 to engage or disengage clutch 106 based on the detected speed. In an embodiment, speed sensor 108 may be a tachometer. In an embodiment, speed sensor 108 may be communicatively wired to send electrical or mechanical signals to clutch 106 or clutch control 107. Speed sensor 108 may be capable of determining a speed at which engaging or disengaging clutch control 106 is preferable. For example, pulsed system 100 may provide an optimized method of energy transfer based on the amount of rotation of a fan and/or rotatable shaft detected by speed sensor 108. The energy transfer method may include, on detecting conditions wherein the flow of moving fluid received by pulsed system 100 is low, uncoupling (e.g., disengaging) clutch 106. As a result of the uncoupling, the resistive load forces are less and the ability of the available flow to overcome resistive forces and generate rotational energy increases. Further, as the generation of rotational energy increases, energy is stored until speed sensor 108 detects an amount of rotation that can transfer energy to energy converter 104.

Wiring 109 may carry an electrical or mechanical signal from speed sensor 108 to clutch 106 and/or clutch control 107 for causing clutch 106 to be engaged or disengaged.

Rotational mass 110 may be a weight loaded onto a rotatable shaft for increasing the angular momentum of the shaft. In an embodiment, rotational mass 110 may act as an energy storage device for a rotatable shaft receiving mechanical energy from a turbine, or similar device. As a result of the energy storage provided by rotational mass 110 and the angular momentum of mass 110, the rotation of the shaft may be prolonged beyond the amount that would be expected were rotational mass 110 not present. Consequently, more mechanical energy may be available for transfer to energy converter 104.

Shaft 111 may receive and transfer rotational energy. In an embodiment, shaft 111 may have at least two segments, which includes at least a first shaft segment 111a and second shaft portion 111b, that connects to a clutch and receives the rotational energy of a turbine or other device for making use of the flow of moving fluids, and a second segment that engages a different end of the clutch and (when clutch 106 is engaged) transfers the rotational energy to energy converter 104. For example, clutch 106 may engage and/or disengage first shaft segment 111a to/from second shaft segment 111b. First shaft segment is attached to the turbine and rotates when turbine 102 is rotated by the flow of fluid. Second shaft segment 111b is connected to energy converter 104, and rotating second shaft segment 111b may cause energy converter 104 to convert the rotational energy of second shaft segment 111b into electrical energy. Thus, by connecting first shaft segment 111a to second shaft segment 111b causes the energy in the rotating turbine to rotate first shaft segment 111a, which in turn rotates second shaft segment 111b, which in turn causes energy converter 104 to convert the rotational energy into electrical energy. In contrast, when clutch 106 disengages, although the turbine rotates first shaft segment 111a, first shaft segment 111a does not rotate second shaft segment 111b (because first shaft segment 111a and second shaft segment 111b are not connected), and consequently energy converter 104 does not convert rotational energy into any other form of energy (because second shaft segment 111b is not rotating).

Turbine 112 may receive the flow of a moving fluid (e.g., air, water, gas) to generate mechanical energy. In an embodiment, turbine 112 may be any of a plurality of bladed devices capable of utilizing the kinetic energy of a moving fluid.

Turbine 112 may be connected to shaft 111, via first shaft segment 111a having rotational mass 110. Consequently, turbine 112 initiates the activity of pulsed system 100. For example, a moving fluid causes the blades of turbine 112 to turn, the turning causing the rotation of shaft 111 which is measured by speed control 106. As the rotational speed increases, clutch 106 engages due to centrifugal force or the signals transmitted by speed sensor 106. Upon engaging, the rotational energy is received by energy converter 104 and converted to electrical energy. Energy converter 104 sends electrical energy to electrical load 102. Energy converter 104 creates drag on turbine 112 and rotating shaft 111. As the drag increases the rotation slows until clutch 106 is caused to disengage, allowing turbine 112 and rotation shaft 111 to rotate faster. The disengaging of clutch 106 may decrease the amount of torque needed for rotatable shaft 111 to turn, and subsequently the amount of energy (e.g., flow of moving fluid) required for causing the segment of rotatable shaft 111 connected to turbine 112 to rotate. Engaging clutch 106 after the turbine is turning allows energy converter 104 to receive the rotational energy generated while clutch 106 was disengaged.

Figure 2:
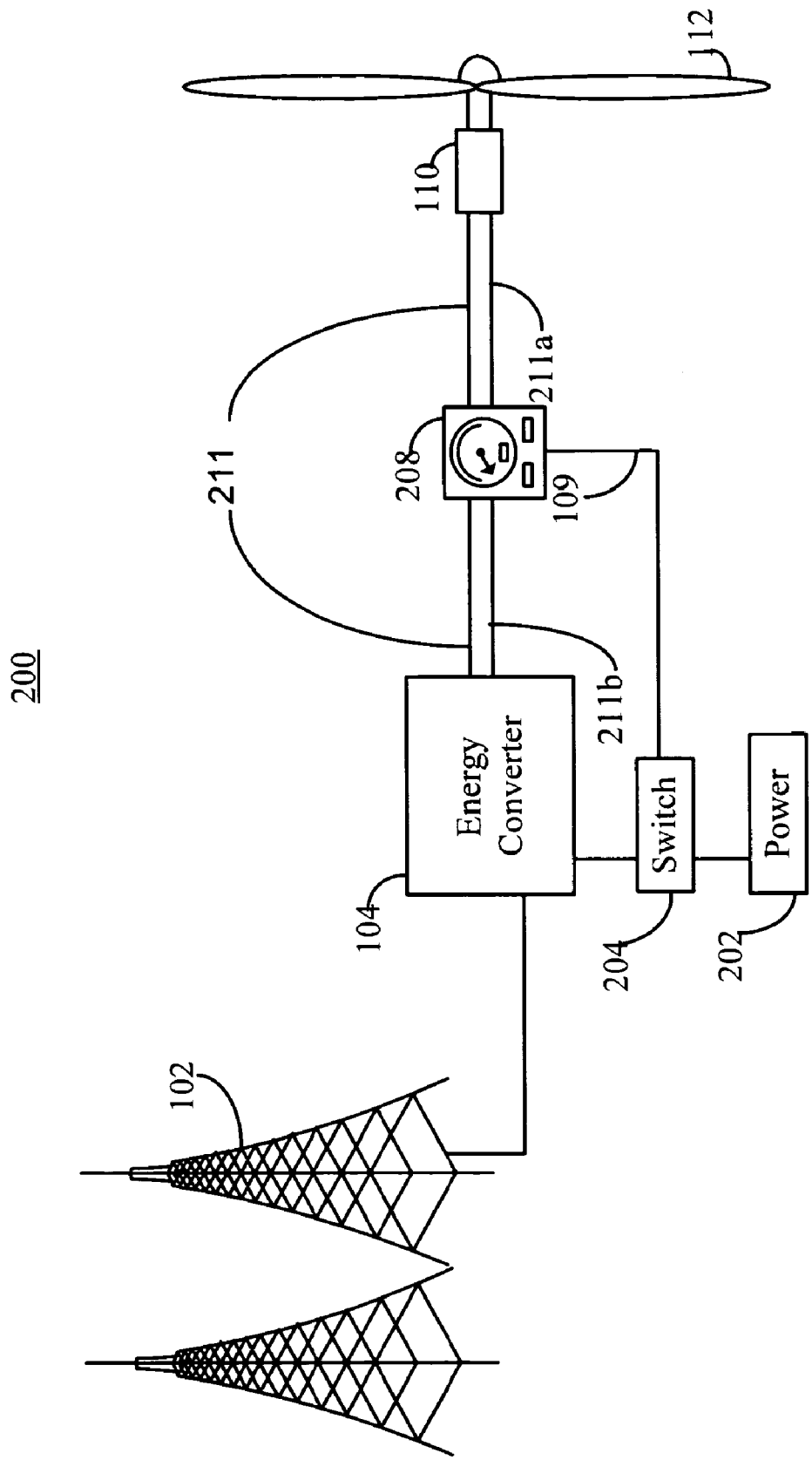
FIG. 2 shows a block diagram of an embodiment of a pulsed generator having a control switch for a magnetic field.

FIG. 2 shows a diagram of an embodiment of pulsed system 200. Pulsed system 200 includes electrical load 102, converter 104, wiring 109, rotational mass 110, turbine 112, power supply 202, switch 204, speed sensor 208, and shaft 211 having first shaft segment 211a and second shaft segment 211b. In other embodiments, pulsed generator 200 may not have all of the components listed above or may have other components instead of and/or in addition to those listed above.

Electrical load 102, converter 104, wiring 109, rotational mass 110, and turbine 112 were discussed above in conjunction with FIG. 1.

Power supply 202 may provide current for powering an electromagnet within energy converter 104 that creates a magnetic field within energy converter 104, which coils attached to shaft 211 rotate within to generate electricity. In an embodiment, power supply 202 may receive electricity from energy converter 104, which may be converted into a form for generating an appropriate magnetic field. Switch 204 allows or disallows the flow of electricity from power supply 202 to the electromagnet of energy converter 104. Speed sensor 208 controls the on/off state of switch 204 to determine whether electric converter 104 receives power from power supply 202. In an embodiment, speed sensor 208 monitors the rotation of shaft 211, deactivating switch 204 when the rotations per minute are below a first threshold value, and activating switch 204 when the rotations per minute are above a second threshold value that is higher than the first threshold. Speed sensor 208 may be an embodiment of speed sensor 108 (of FIG. 1) having a wired connection to a switch for turning energy converter 104 on or off. Shaft 211 is similar to shaft 111, except that first shaft segment 211a and second shaft segment 211b may be integrally connected to one another, whereas first shaft segment 111a and second shaft segment 111b can be connected and disconnected to one another.

Figure 3:
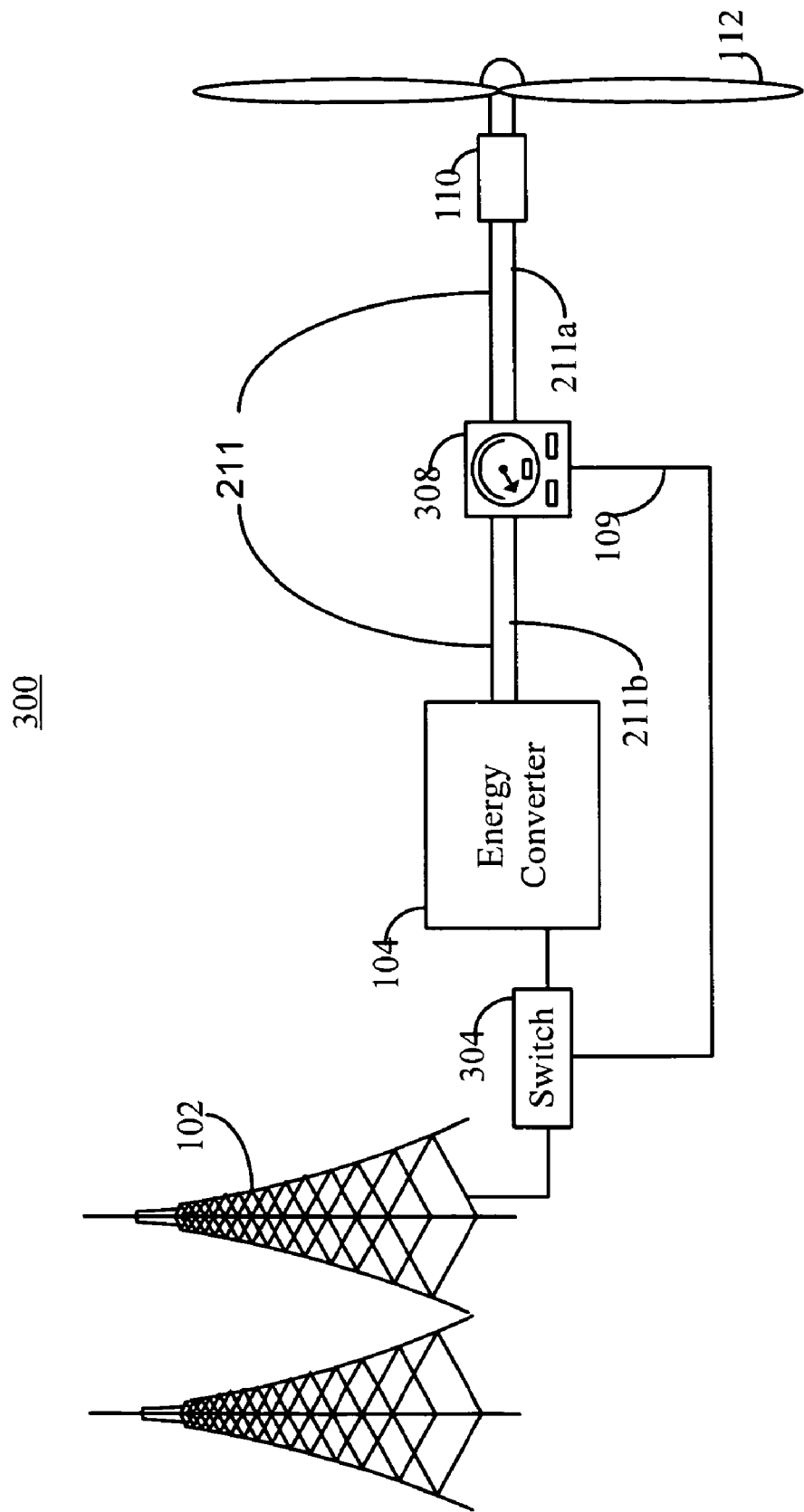
FIG. 3 shows a block diagram of an embodiment of a pulsed generator having a control switch for an energy converter.

FIG. 3 shows a diagram of an embodiment of pulsed system 300. Pulsed generator 300 includes electrical load 102, converter 104, wiring 109, rotational mass 110, turbine 112, shaft 211 having first shaft segment 211a and second shaft segment 211b, switch 304 and speed sensor 308. In other embodiments, pulsed system 300 may not have all of the components listed above or may have other components instead of and/or in addition to those listed above.

Electrical load 102, converter 104, wiring 109, rotational mass 110, and turbine 112 were discussed above in conjunction with FIG. 1. Shaft 211, first shaft segment 211a, second shaft segment 211b were discussed in conjunction with FIG. 2.

Switch 304 allows or disallows the flow of electricity from energy converter 104 to electrical load 102. Speed sensor 308 may be an embodiment of speed sensor 108 having a wired connection to a switch for opening or closing an electrical connection between energy converter 104 and electrical load 102. In an embodiment, speed sensor 308 may open switch 304 (disconnecting electrical load 102) when a first threshold speed is detected, and close switch 304 (connecting electrical load 102) when a second threshold speed is detected that is higher than the first threshold speed. In an embodiment, electrical load 102 may be connected to and disconnected from an energy converter within system 300 for enabling the usage, storage or transmission of power generated by pulsed system 300. As a result of electrical load 102's consumption of power when connected to an energy transferring component of system 300, load impedance may increase and induce drag on components of system 300 (e.g., a fan or turbine). Consequently, when disconnected from an energy transferring component of system 300, the drag on components of system 300 decreases, allowing turbine 112 to spin more freely and store energy.

Figure 4:
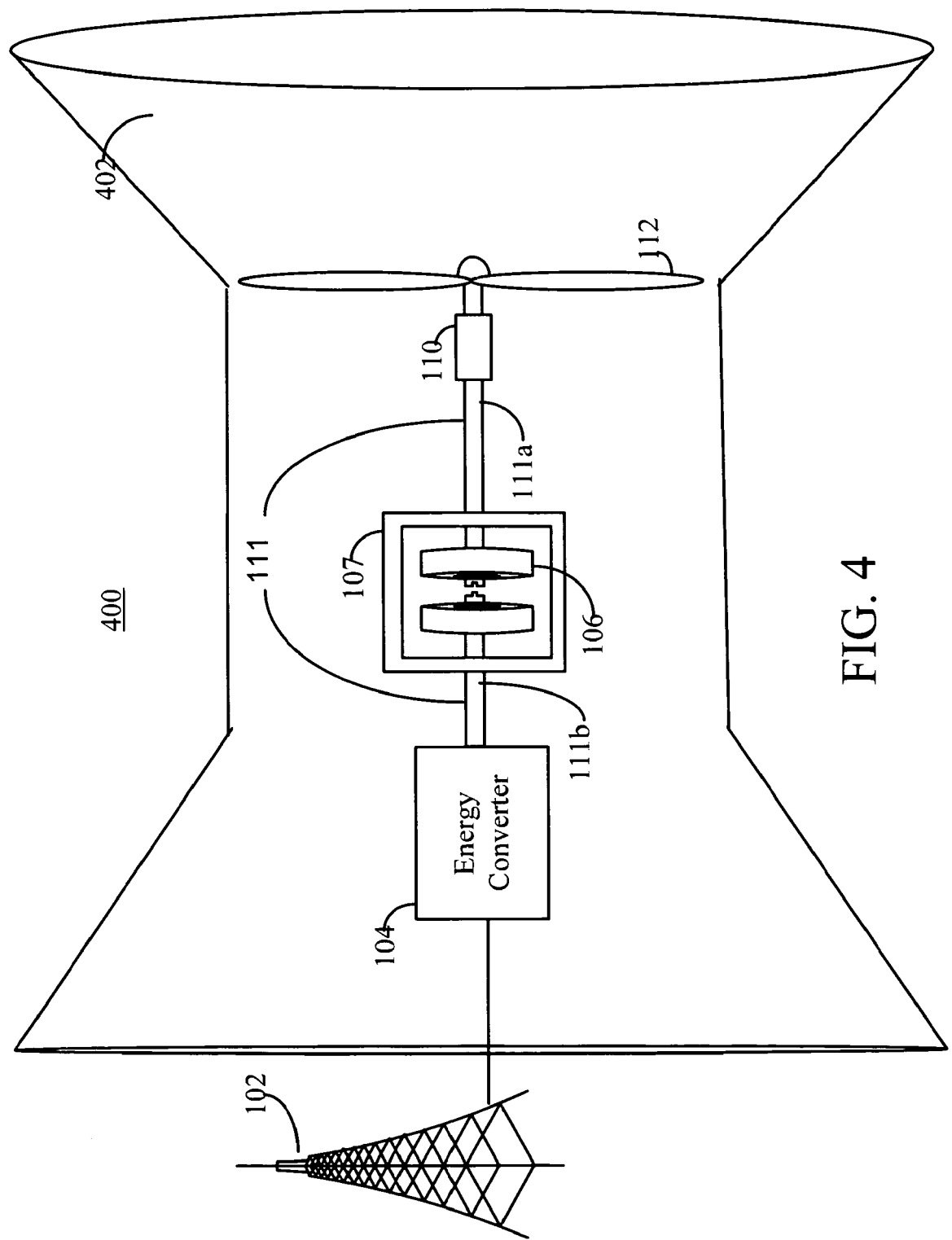
FIG. 4 shows a block diagram of an embodiment of a pulsed generator having a flow condensing funnel.

FIG. 4 shows a diagram of an embodiment of flow condensing system 400. Flow condensing system 400 includes electrical load 102, converter 104, clutch 106, clutch control 107, rotational mass 110, shaft 111, turbine 112, and condenser 402. In other embodiments, flow condensing generator 400 may not have all of the components listed above or may have other components instead of and/or in addition to those listed above.

Electrical load 102, converter 104, clutch 106, clutch control 107, rotational mass 110, shaft 111, first shaft segment 111a, second shaft segment 111b, and turbine 112 were discussed above in conjunction with FIG. 1.

Flow condensing system 400 may direct moving fluid inwards against turbine 112 to increase the volume of fluid that flows through flow condensing system 400 for generating energy (as compared to systems not having any flow condensing). In an embodiment, flow condensing system 400 may direct more fluid towards turbine 112 at a faster rate of flow than would be expected without the flow condensing components of flow condensing system 400. Condenser 402 may condense fluid flowing towards turbine 112. As the fluid flows through the narrow portion of condenser 402, the rate of flow increases. In an embodiment, condenser 402 may have a funnel shape capable of increasing the volume of fluid sent to turbine 112. Condenser 402 has a funnel shape that has a wide opening facing oncoming fluid that is directed towards turbine 112. Condenser 402 narrows in a direction moving away (or down stream) from the opening towards the blades of turbine 112, but stays the same width once the turbine blades are reached and either gets wider or stays the same width once past (or down stream from) the turbine blade in the direction of the fluid flow. In an embodiment, the inlet and outlet ends may be reversed to flow in the other direction with no effect on operation. The wide exit portion of condenser 402 is optional.

Any of the embodiments of FIGS. 1-4 may be used together in any combination to get different embodiments. For example, clutch 106 and clutch control 107 (which engages or disengages the shaft of the generator) may be used together with any of the embodiments of FIGS. 2-4. Switch 204 for turning off the current in the electromagnet and switch 304 for electrically disconnecting the grid or another electrical load may be included in the same embodiment, which in one embodiment includes and in another embodiment does not include rotational mass 112, and which may or may not include condenser 402. In any of the embodiments in this specification, the electrical loads and/or mechanical loads (e.g., grid 102, energy converter 104, and/or mass 110), via switches 204 or 304, or clutch 106 (e.g., via clutch control 107), may be engaged or disengaged periodically at regular intervals or at irregular intervals of time. In an embodiment the intervals of time may depend on the speed of the fluid. The thresholds for engaging and disengaging the various mechanical and/or electrical loads and/or turning on and off the magnetic field may be the same or different form one another no matter which of the embodiments are combined together or are not combined together. Also, any auxiliary turbine (if any are present) may be constructed in the same fashion as any one of or any combination of the turbines of FIG. 104. Thus, any auxiliary turbine for supplying a current to the magnetic field generating coils may have its own set of thresholds. Similarly, any auxiliary turbines (if any) may also have switches for engaging and disengaging an electrical load (e.g., the current supplied by the auxiliary turbine to the magnetic field producing coils of a main turbine) and/or the magnetic field coils of the auxiliary turbine. Additionally or alternatively, any auxiliary turbine may have a clutch for engaging and disengaging a rotational mass on the shaft of the auxiliary turbine and/or two portions of the shaft of the auxiliary turbine (engaging and disengaging the two portions of the shaft of the auxiliary turbine may engage and disengage the energy converter of the auxiliary turbine).

Figure 5:
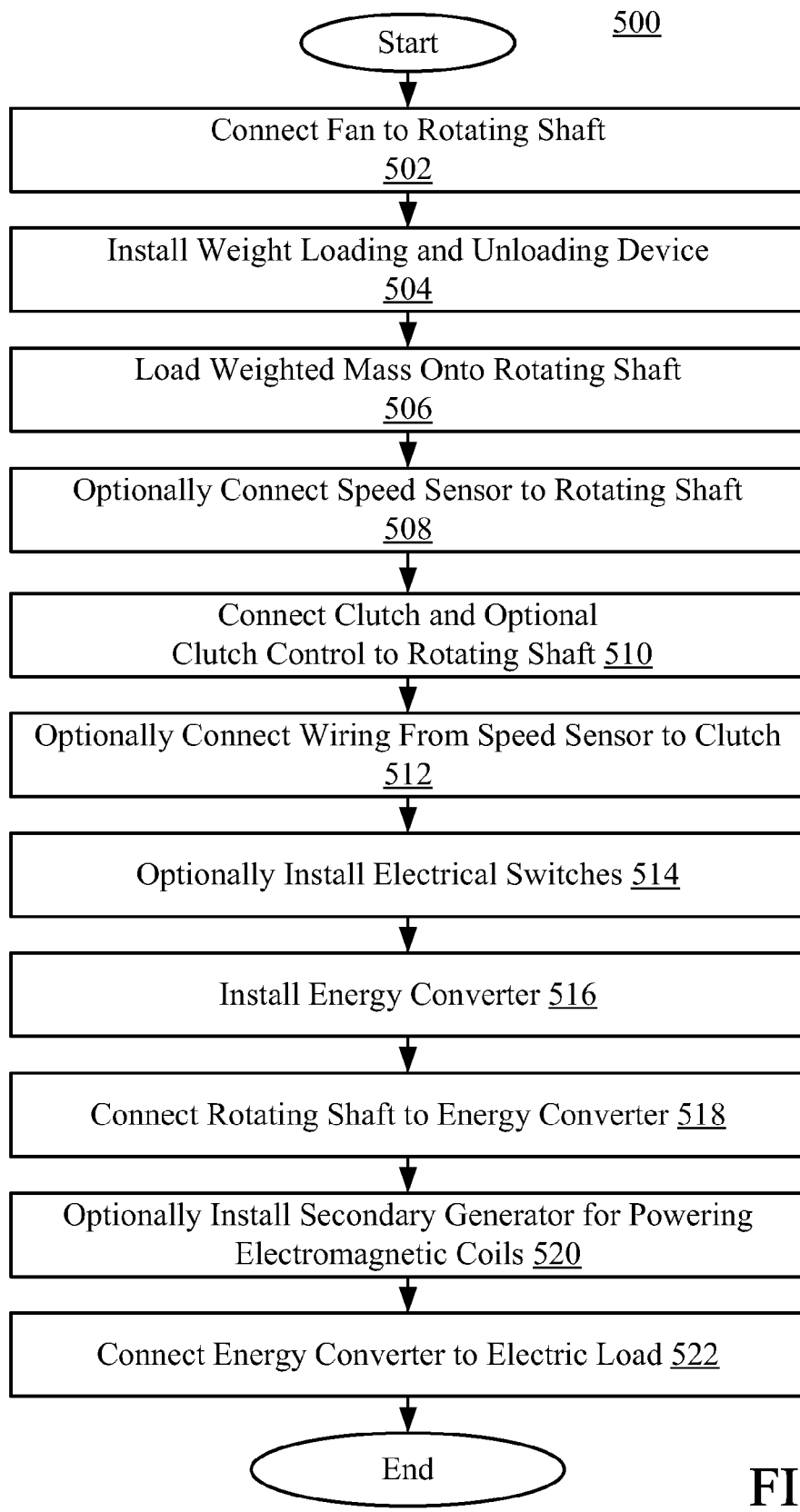
FIG. 5 shows a flowchart of an example of a method of assembling a pulsed generator system.

FIG. 5 is a flowchart of an example of a method 500 of making a pulsed energy generator.

In step 502, a rotatable shaft is attached to a propeller to form a turbine.

Step 502 may include forming the propeller to increase the propellers ability to make use of the motion of a moving fluid. For example, the propeller may be formed into the shape of a wing for enhancing the lift on the propeller caused by moving air. The rotatable shaft may be formed of materials known to minimize resistive forces acting on the rotatable shaft as it turns.

In optional step 504, a device for loading and unloading a weighted mass onto and off of shaft 111 may be installed. In optional step 506, a weighted mass is loaded onto the rotating shaft.

In step 508, speed sensor (such as speed sensor 108, 208 or 308 of FIGS. 1-3) is connected to the rotating shaft. Step 508 may include, attaching the speed sensor to the rotatable shaft at a segment of the shaft containing a feature (e.g., a hole) for allowing speed sensor to make measure the rotations of rotatable shaft 111. For example, speed sensor may send a beam of light through a hole in rotatable shaft 111, and determine the number of times the beam of light is broken over a period of time (e.g., 60 seconds).

In step 510, optional clutch 106 and/or optional clutch control 107 are connected to rotating shaft 111. Step 510 may include attaching a portion of the clutch to a segment of shaft 111 joined to turbine 112, and attaching a second portion of the clutch to a segment of the shaft joined to energy converter 104. As part of step 510, the interlocking function of the portions of clutch 106 may be tested.

In optional step 512, wiring for sending a signal from speed sensor to clutch 106 and/or optional clutch control 107 is installed. Step 512 may include attaching a wire capable of transmitting electrical current to a connector on clutch control 107 for receiving a current and speed sensor 108 for sending a current. Optionally, the wiring may be attached directly to clutch 106.

In optional step 514, electrical switches for engaging clutch 106 and controlling the transmission of energy to electrical grid 102 are installed.

In step 516 energy converter 104 is installed.

In step 518, shaft 111 is connected to energy converter 104. Step 518 may include moving a section of shaft 111 having coils into a portion of energy converter 104 capable of producing an electromagnetic field.

In optional step 520, a secondary generator for powering the electromagnetic field coils of energy converter 104 is installed.

In step 522, energy converter 104 is connected to electrical load 102. Step 522 may include wiring energy converter 104 to directly or indirectly (e.g., via an electrical control switch) transmit electrical energy to electric load 102.

In an embodiment, each of the steps of method 500 is a distinct step. In another embodiment, although depicted as distinct steps in FIG. 5, steps 502-522 may not be distinct steps. In other embodiments, method 500 may not have all of the above steps and/or may have other steps in addition to or instead of those listed above. The steps of method 500 may be performed in another order. Subsets of the steps listed above as part of method 500 may be used to form their own method.

FIG. 6 is a flowchart of an example of a method 600 of using a pulsed system. In step 602, the flow of a moving fluid is received at turbine 112. Step 602 may include the generation of mechanical energy from the flow of the moving fluid.

In optional step 604, the rotational speed of shaft 111 is detected by a speed sensor, such as speed sensor 108, 208, 308 or a similar device for detecting rotational speed. If a mechanical clutch is used there may not be an actual determination of the speed of the turbine.

In step 606, in an embodiment, the rotational speed of shaft 111 is compared to a first threshold value. If the rotational speed is insufficient for engaging the clutch, the method returns to step 602 for generating mechanical energy or remains in step 602. In the case of an automatic mechanical clutch, the decision represented by step 606 is not expressly carried out. Instead, when the rotational speed is insufficiently the centrifugal force is not high enough to cause the clutch to engage and so the clutch does not engage, and method 600 remains in step 602. When the speed is above the first threshold value, as result of the decision of step 606, the method continues to optional step 607 or to step 608 or 610 if step 607 is not present. In the case of an automatic mechanical clutch, when the rotational speed is sufficiently high the centrifugal force causes the clutch to engage, which brings method 600 to optional step 607 or to step 608 or 610 if step 607 is not present, without a decision expressly being made. In step 607, clutch 106 engages shaft 111, thereby engaging energy converter 104 after step 607, method 600 continues to step 608.

In optional step 608, a determination is made whether an electromagnetic field generator for at least partially powering energy converter 104 is ready. When a desired electromagnetic field is generated (or reaches a certain strength), the method continues to optional step 610. If energy converter 104 has an external power source, if the generator uses permanent magnets, or if the coils that produce the magnetic field (e.g., the coils of the stator) are powered by a secondary generator that uses a permanent magnet of producing the magnetic field, step 608 may be unnecessary.

In optional step 610, electrical load 102 is connected to energy converter 104, causing the resistive forces of electrical load to act on the circuit having energy converter 104 and turbine 112. Additionally or alternatively, load 110 is added to the shaft 111 (e.g., as a result of centrifugal force on a second clutch located in the vicinity of load 110 or a signal sent to a mechanical device control from a speed sensor that loads load 110 onto shaft 111.

In optional step 612, the rotational speed of shaft 111 is compared to a second threshold value, which causes a signal to be sent to disengage clutch 106. Alternatively, the rotational speed of shaft 111 may reach a velocity at which centrifugal forces (e.g., even with the are assistance of any frictional forces acting on the clutch arms that keep the clutch arms extended and engaged) are insufficient to keep the automatic clutch engaged. Optionally, the second threshold is lower than the first threshold. In another embodiment, the first threshold is the same as the second threshold.

In step 614, as a result of a rotational rate lower that the second threshold value, or too small to keep an automatic clutch engaged, electrical converter 104 is disconnected from shaft 111 and turbine 112, significantly diminishing the resistive forces acting on shaft 111 and turbine 112 (e.g., the electrical load and mechanical drag). Method 600 then returns to the mechanical energy generation of step 602. When the rotational speed is above the second threshold value, or above a velocity at which resistive forces are insufficient to cause an automatic clutch to disengage, the method continues to step 616. In the case of an automatic clutch that is activated mechanically steps 614 and 616 may not be two distinct steps and/or step 614 may not be a distinct decision process. Alternatively, the rotational speed of shaft 111 may be measured and when send threshold is reached a signal is send to disengage clutch 106.

In step 616, as a result rotational speed exceeding the second threshold value, or due to an amount of rotation great enough for an automatic clutch to remain engaged, the rotational energy generated as a result of steps 602-612 is transferred to energy converter 104. In step 616, a segment of shaft 111 having coils (e.g., the rotator) may rotate within an electromagnetic field of energy converter 104. As a result of the spinning of coils within the magnetic field, an electrical current may be generated in the rotator. Although in this specification, as an example, the stator coils generate the magnetic field and the rotator coils moving in the magnetic field generate a current the rotator coils may by powered to generate a magnetic field and the electric current may be generated in the coils of the stator.

In step 618, the spinning of the coiled segment of shaft 111 within the electromagnet of energy converter 104 (step 616) creates an electrical current.

In step 620, the electrical energy generated by energy converter 104 is transferred to electrical load 102. Step 620 may include the maintaining of an optional electrical switch in a closed position for allowing the flow of electrical current from energy converter 104 to electrical load 102. Alternatively, the transfer of electrical energy from energy converter 104 to load 102 may be an automatic process. Although listed as separate and distinct steps, each of steps 616-620 may not be separate and distinct steps, but just different aspects of what happens or simultaneous events that occur while a powered by a turbine generator is generating electricity, for example.

In an embodiment, each of the steps of method 600 is a distinct step. In another embodiment, although depicted as distinct steps in FIG. 6, steps 602-620 may not be distinct steps. In other embodiments, method 600 may not have all of the above steps and/or may have other steps in addition to or instead of those listed above. The steps of method 600 may be performed in another order. Subsets of the steps listed above as part of method 600 may be used to form their own method.

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A system comprising:
   a turbine for converting energy of a flowing medium into electrical energy;
   a load;
   the load having at least two states,
      in a first of the at least two states the load is engaged with the turbine, slowing the speed at which the turbine spins, and
      in a second of the at least two states the load is disengaged from the turbine,
   the load being configured such that
      the load engages the turbine at a first threshold value, which is a turbine speed that is high enough to generate energy for duration of time after the load engages, while the turbine slows down as a result of the load engaging, but that is not high enough for the turbine to continue to generate energy with the load engaged, and
      the load disengages from the turbine when the speed of the turbine is below a second threshold value, the second threshold value being less than the first threshold value;
   a controller that periodically engages and disengages the load from a turbine at fixed intervals of time, while the fluid flows at a fixed speed; the time interval being dependent on a fluid speed of the fluid.

2. The system of claim 1, the load includes a generator, and engaging the load engages the generator, the generator does not draw power to act as a motor while engaged with the turbine.

3. The system of claim 1 the load includes a mass, engaging the load engages the mass
   altering the moment of inertia of the turbine, such that the turbine spins slower.

4. The system of claim 1 the load including at least an electrical load.

5. The system of claim 1, the load including at least a mechanical load, the system further comprising a clutch that engages the load to the turbine as a result of centrifugal force pulling arms of the clutch outwards during the first state.

6. The system of claim 5, load also includes at least an electrical load further comprising:
   a switch that is configured to electrically engage the electrical load while the turbine is spinning at a speed above a third threshold value as a result of the switch being in a first state, the switch causes the electrical load to disengage from the turbine when the speed of the turbine is below a fourth threshold value, as result of the switch being in a second state, the first state being different form the second state, and the third threshold value being higher than the fourth threshold value.

7. The system of claim 5, the arms being located on a first shaft each having a portion that engages a second shaft, one of the first and second shaft is associated with the turbine and the other of the first and second shaft is associated with the load, such that when the arms engage the second shaft the load is engaged to the turbine and when the arms disengage the second shaft the arms disengage from the turbine;
   the portion each of the arms that engages the second shaft are stationary with respect to the arms to which the portions are attached.

8. The system of claim 1, further comprising:
   a speed sensor for determining the speed at which the turbine rotates; and
   a clutch,
   the speed sensor sending a signal to the clutch causing the clutch to place the load in one of the at least two states.

9. The system of claim 1, further comprising a funnel, the turbine being located within
   the funnel, the funnel having an opening at one end of the funnel that is wider than other sections of the funnel, the funnel directing fluid towards the turbine, such that as the fluid travels towards the turbine within the funnel, the fluid travels towards a portion of the funnel that is narrower than the opening, the funnel being oriented about an axis that is parallel to an axis of the turbine, the funnel having a preferred direction for catching fluid, the preferred direction being parallel to the axis, such that a greater amount of fluid is caught by the funnel when the fluid travels in the preferred direction than when the fluid travels in another direction, fluid traveling in the preferred direction that is caught by the funnel tends to travel through the funnel in the preferred direction through the turbine and tends to power the turbine.

10. The system of claim 1, the turbine having blades that are constructed from a rigid material.

11. The system of claim 10, the electrical load engaging the turbine by at least the electrical load engaging a generator that is engaged with the turbine.

12. A system comprising:
a turbine for converting energy of a flowing medium into electrical energy;
a load; and
a mechanism that is configured to engage the load while the turbine is spinning, the load has at least two states, in a first of the at least two states the load is engaged with the turbine, slowing the speed at which the turbine spins, and then in a second of the at least two states the load is disengaged from the turbine, the mechanism causes the load to disengage from the turbine when the speed of the turbine is below a threshold value;
the load includes a generator, and engaging the load engages the generator;
the turbine including at least blades mounted on a first shaft that rotates, such that as a fluid flows passed that blades of the turbine, the fluid causes the blades to rotate;
and as the blades rotate, the first shaft rotates with the blades, the generator including at least
a stator having a stationary magnet that generates a magnetic field a second shaft,
a rotator connected to the second shaft, the rotator includes at least coils of electrical wire, as the second shaft rotates, the rotator rotates, which generates an electric current in the coils; and
the mechanism including at least a clutch for engaging the first shaft, which is connected to the turbine, to the second shaft, which is connected to the generator;
the system further comprising:
a speed sensor for sensing the speed at which blades of the turbine rotate, signals from the speed indicating a speed at which the turbine rotates; and
a controller for causing
the clutch to engage and disengage, based on the signals from speed sensor, which are received by the controller, the controller causing the clutch to engage the first shaft to the second shaft when the turbine spins at a speed above a first threshold speed, and
the clutch to disengage when the turbine spins at a speed that is below a second threshold speed that is below the first threshold speed; and
the controller also periodically engages and disengages the load from a turbine at fixed intervals of time, while the fluid flows at a fixed speed; the time interval being dependent on a fluid speed of the fluid.

13. The system of claim 12 the load includes a mass, engaging the load engages the mass altering the moment of inertia of the turbine, such that the turbine spins slower.

14. The system of claim 12, further comprising:
an electrical load;
a switch communicatively coupled to the load for electrically connecting and disconnecting the load to the generator, based on the signals from the speed sensor, which are received by the switch, the switch causing the electrical load to be electrically connected to the generator when the turbine spins at a speed above a third threshold speed, and
the load to be electrically disconnected from the generator when the turbine spins at a speed below a fourth threshold speed that is lower than the third threshold.

15. A system comprising:
a turbine for converting energy of a flowing medium into electrical energy;
a load; and
a mechanism that is configured to engage the load while the turbine is spinning, the load has at least two states, in a first of the at least two states the load is engaged with the turbine, slowing the speed at which the turbine spins, and then in a second of the at least two states the load is disengaged from the turbine, the mechanism causes the load to disengage from the turbine when the speed of the turbine is below a threshold value;
the load including at least an electrical load;
the turbine including at least blades attached to a shaft, such that as a fluid flows passed the blades of the turbine, the blades rotate causing the shaft to rotate with the blades;
the system further comprising a generator including at least
a stator having a stationary magnet that generates a magnetic field a rotator coupled to the shaft, the rotator includes at least coils of electrical wire, as the shaft rotates, the rotator rotates, which generates an electric current in the coils; and
a speed sensor for sensing the speed at which blades of the turbine rotate, signals from the speed indicating a speed at which the turbine rotates; and
a switch communicatively coupled to the load for electrically connecting and disconnecting the load to the generator, based on the signals from the speed sensor, which are received by the switch, the switch causing
the load to be electrically connected to the generator when the turbine spins at a speed above a first threshold speed, and
the load to be electrically disconnected from the generator when the turbine spins at a speed below a second threshold speed that is lower than the first threshold speed.

16. The system of claim 15, further comprising a mass that engages the shaft altering the
moment of inertia of the turbine, such that the turbine spins slower.

17. A method comprising:
allowing a fluid to turn a turbine;
periodically engaging and disengaging a load from the turbine at intervals of time;
the time intervals being dependent on a fluid speed of the fluid, such that for a constant fluid speed the time intervals are equal to one another.

18. The method of claim 17, further comprising:
determining that
the fluid speed is sufficient to drive the turbine while the load is disengaged, and
the fluid speed is insufficient to keep the turbine turning while the load is engaged; and
in response to the determining performing the periodically engaging and disengaging.

19. The method of claim 17, the periodically engaging and disengaging being performed
by at least
engaging the load when the turbine speed is above a first threshold; and
disengaging the load when the turbine speed is below a second threshold that is lower than the first threshold.

20. The method of claim 17, the turbine having at least blades that rotate in response to a fluid passing by the blades, and a shaft that is connected to, and rotates with, the blades;

the engaging includes at least moving a mass from a first position to a second position in which the mass is engaged with a portion of a shaft so that the mass rotates with the shaft; and the disengaging includes at least moving the mass from the second position to the first position so that the mass does not rotate with the shaft.

* * * * *